United States Patent
Yajima et al.

(10) Patent No.: US 10,673,079 B2
(45) Date of Patent: Jun. 2, 2020

(54) FUEL CELL STACK

(71) Applicant: NISSAN MOTOR CO., LTD., Yokohama-shi, Kanagawa (JP)

(72) Inventors: Kentarou Yajima, Kanagawa (JP); Masanari Yanagisawa, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 29 days.

(21) Appl. No.: 16/061,934

(22) PCT Filed: Sep. 30, 2016

(86) PCT No.: PCT/JP2016/079118
§ 371 (c)(1),
(2) Date: Oct. 18, 2018

(87) PCT Pub. No.: WO2017/104226
PCT Pub. Date: Jun. 22, 2017

(65) Prior Publication Data
US 2019/0260039 A1    Aug. 22, 2019

(30) Foreign Application Priority Data
Dec. 15, 2015  (JP) .................................. 2015-244453

(51) Int. Cl.
*H01M 2/40*    (2006.01)
*H01M 8/0258*  (2016.01)
(Continued)

(52) U.S. Cl.
CPC ....... *H01M 8/0258* (2013.01); *H01M 8/0202* (2013.01); *H01M 8/0232* (2013.01);
(Continued)

(58) Field of Classification Search
CPC ............ H01M 8/0258; H01M 8/0202; H01M 8/0232; H01M 8/12; H01M 8/1246; H01M 8/2425; H01M 2300/0074
See application file for complete search history.

(56) References Cited

U.S. PATENT DOCUMENTS

| | | |
|---|---|---|
| 6,649,297 B1 | 11/2003 | Marchand et al. |
| 7,147,956 B2 | 12/2006 | Ohtani et al. |
| (Continued) | | |

FOREIGN PATENT DOCUMENTS

| | | |
|---|---|---|
| CN | 103636044 A | 3/2014 |
| CN | 104157893 A | 11/2014 |
| (Continued) | | |

*Primary Examiner* — Jane J Rhee
(74) *Attorney, Agent, or Firm* — Foley & Lardner LLP (57) ABSTRACT

A fuel cell stack includes a plurality of fuel cells stacked via separators, each one of which cells has a solid electrolyte plate interposed between an anode electrode and a cathode electrode. The separator is constituted of an uneven member that includes a first abutting portion, a second abutting portion, and a connecting portion, the first abutting portion abuts on one fuel cell of the two adjacent fuel cells, the second abutting portion abuts on the other fuel cell, and the connecting portion connects the first abutting portion to the second abutting portion. At least one abutting portion of the first abutting portion or the second abutting portion has a section modulus greater than a section modulus of the connecting portion.

9 Claims, 8 Drawing Sheets (51) Int. Cl.
  *H01M 8/0232* (2016.01)
  *H01M 8/1246* (2016.01)
  *H01M 8/2425* (2016.01)
  *H01M 8/12* (2016.01)
  *H01M 8/0202* (2016.01)
  *H01M 8/124* (2016.01)

(52) U.S. Cl.
  CPC ........... *H01M 8/12* (2013.01); *H01M 8/1246* (2013.01); *H01M 8/2425* (2013.01); *H01M 2008/1293* (2013.01); *H01M 2300/0074* (2013.01)

(56) References Cited

U.S. PATENT DOCUMENTS

| | | |
|---|---|---|
| 8,455,156 B2 | 6/2013 | Yamamoto et al. |
| 9,455,454 B2 | 9/2016 | Okuyama et al. |
| 2001/0008719 A1 | 7/2001 | Ikeda |
| 2002/0061428 A1 | 5/2002 | Ohtani et al. |
| 2008/0152983 A1 | 6/2008 | Horiuchi et al. |
| 2010/0239957 A1 | 9/2010 | Yamamoto et al. |
| 2011/0123904 A1 | 5/2011 | Fujimura et al. |
| 2013/0216931 A1* | 8/2013 | Sun .................. H01M 8/0206 429/468 |
| 2015/0037704 A1 | 2/2015 | Iritsuki et al. |

FOREIGN PATENT DOCUMENTS

| | | |
|---|---|---|
| EP | 1 887 643 A1 | 2/2008 |
| EP | 2 728 655 A1 | 5/2014 |
| EP | 3 306 719 A1 | 4/2018 |
| FR | 2786027 A1 | 5/2000 |
| JP | 2001-35514 A | 2/2001 |
| JP | 2002-117866 A | 4/2002 |
| JP | 2007-149478 A | 6/2007 |
| JP | 2008-159448 A | 7/2008 |
| JP | 2009-117220 A | 5/2009 |
| JP | 2009-152134 A | 7/2009 |
| JP | 2010-167441 A | 8/2010 |
| JP | 2012-14940 A | 1/2012 |
| JP | 2013-197075 A | 9/2013 |
| JP | 2015-514281 A | 5/2015 |

* cited by examiner

FUEL CELL STACK

This application claims a priority based on a patent application No. 2015-244453 filed with the Japanese Patent Office on Dec. 15, 2015, the entire contents of which application are incorporated herein by reference.

TECHNICAL FIELD

The present invention relates to a fuel cell stack in which a plurality of fuel cells including solid electrolyte plates are stacked.

BACKGROUND ART

JP2008-159448 has disclosed a fuel cell stack constituted of a plurality of stacked solid oxide fuel cells including solid electrolyte plates and pairs of electrodes that sandwich this electrolyte plates.

SUMMARY OF INVENTION

In such a solid oxide fuel cell stack, a separator as a current collector is arranged between the adjacent fuel cells. The separator is configured as an uneven member that includes an abutting portion abutting on each of the two adjacent fuel cells and a connecting portion connecting both abutting portions.

The fuel cell stack is a stacked cell in which a plurality of members such as fuel cells and separators are stacked, and it is important to cause the abutting members to be brought in close contact mutually for reducing contact resistance between the members. Therefore, the fuel cell stack is configured by assembling the respective members in a state where loads are applied from a lamination direction of the fuel cells.

Thus, the load applied on stacking causes the separator to be pressed in the lamination direction, then, the connecting portion near the abutting portion is deformed so as to decrease a thickness of the separator. The present inventors have found that in the fuel cell stack with stacked fuel cells, a central portion of the abutting portion is bent as rising from the electrode of the fuel cell following the deformation of the separator connecting portion on stacking, thus generating a gap between the abutting portion of the separator and the electrode of the fuel cell. The generation of the gap increases the contact resistance between the separator and the fuel cell to decrease power generation efficiency of the fuel cell stack.

It is an object of the present invention to provide a fuel cell stack configured to reduce increase of contact resistance by enhancing close contactness between the fuel cell and the separator.

A fuel cell stack according to one aspect of the present invention is a fuel cell stack in which a plurality of fuel cells are stacked via separators, and each fuel cell of the stack includes a solid electrolyte plate interposed between an anode electrode and a cathode electrode. The separator is constituted of an uneven member that includes a first abutting portion, a second abutting portion, and a connecting portion, the first abutting portion abuts on one fuel cell of the two adjacent fuel cells, the second abutting portion abuts on the other fuel cell, and the connecting portion connects the first abutting portion to the second abutting portion. At least one abutting portion of the first abutting portion or the second abutting portion has a section modulus greater than a section modulus of the connecting portion.

DESCRIPTION OF EMBODIMENTS

The following describes the embodiments of the present invention with reference to the drawings or similar reference.

First Embodiment

Figure 1:
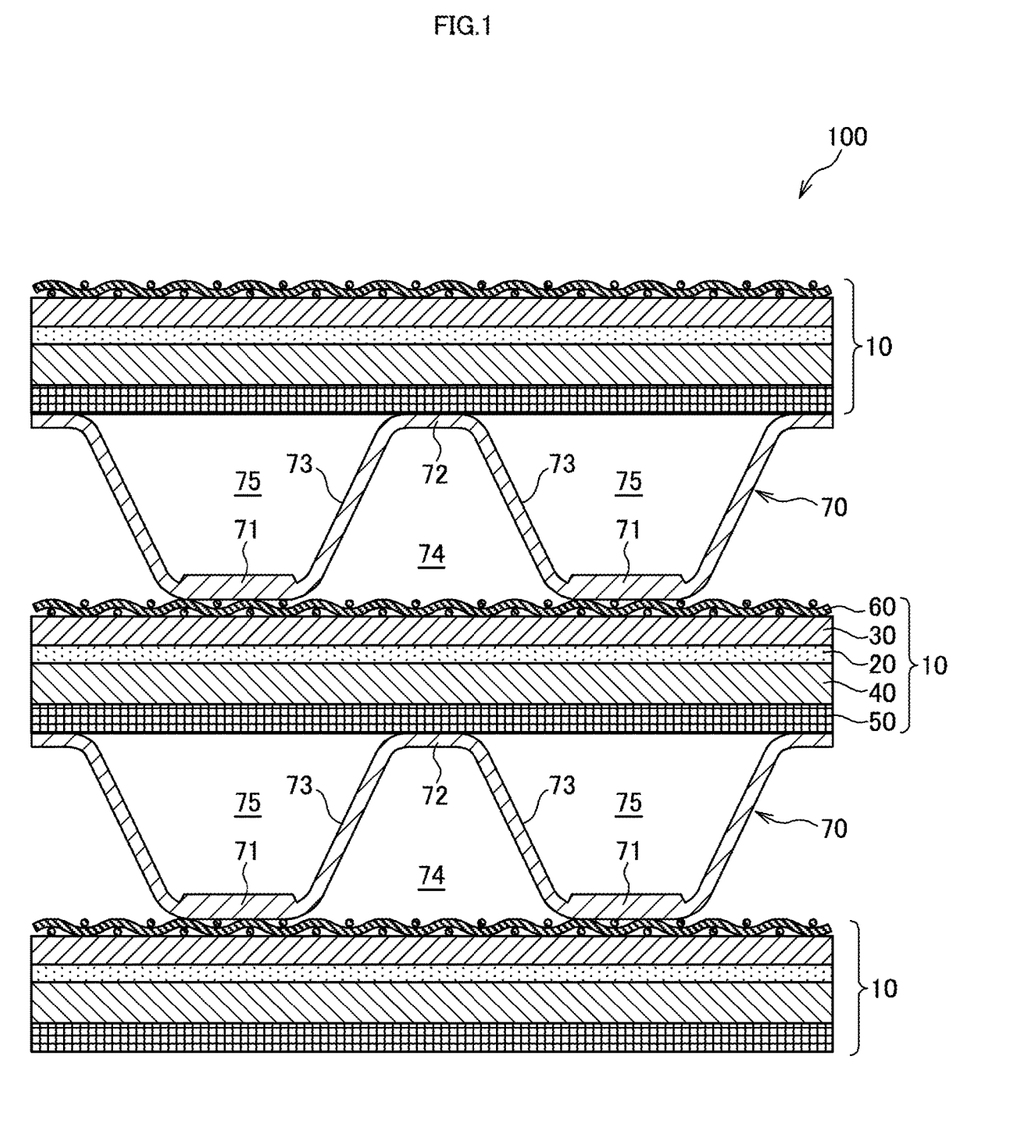
FIG. 1 is a schematic configuration diagram of a solid oxide fuel cell stack according to a first embodiment of the present invention.

FIG. 1 is a schematic configuration diagram of a solid oxide fuel cell stack 100 according to a first embodiment of the present invention.

The fuel cell stack 100 is a stacked cell formed by sequentially stacking solid oxide fuel cells 10 as unit cell and separators 70. While in this embodiment, it is premised that the fuel cell stack 100 is mounted on a moving vehicle such as an electric vehicle and a hybrid vehicle, the fuel cell stack 100 may be used as power sources of various electrical devices and similar use.

The solid oxide fuel cell stack 100 has a high operating temperature of approximately 700 to 800° C., and has a high power generation efficiency compared with a conventional polymer electrolyte fuel cell stack. In the solid oxide fuel cell stack 100, air is used as a cathode gas, and hydrogen and a hydrocarbon fuel such as methane are used as an anode gas. A fuel gas used as the anode gas in the fuel cell stack 100 is selected corresponding to a fuel cell system to be established.

The solid oxide fuel cell 10 constituting the fuel cell stack 100 includes a solid electrolyte plate 20, a cathode electrode 30 arranged on one surface of the solid electrolyte plate 20, an anode electrode 40 arranged on the other surface of the solid electrolyte plate 20, and a metal plate 50 disposed so as to support the anode electrode 40.

The solid electrolyte plate 20 is a member made of, for example, yttria-stabilized zirconia (YSZ) and having oxide-ion conductivity. The solid electrolyte plate 20 is formed as a film body that has a thickness of approximately tens of microns.

The cathode electrode 30 is disposed so as to be in contact with a top surface of the solid electrolyte plate 20. The cathode electrode 30 is plate-shaped porous member made of, for example, lanthanum strontium cobalt ferrite (LSCF). In the cathode electrode 30, a reduction reaction that reduces oxygen in the cathode gas (air) occurs.

The anode electrode 40 is disposed so as to be in contact with a lower surface of the solid electrolyte plate 20. The anode electrode 40 is a plate-shaped porous member made of, for example, a metal such as nickel and an oxide such as yttria-stabilized zirconia (YSZ). In the anode electrode 40, an oxidation reaction that oxidizes the anode gas such as hydrogen with oxygen ions conducted through the solid electrolyte plate 20 occurs. The solid oxide fuel cell 10 performs electric generation on the basis of the above-described electrode reactions in the cathode electrode 30 and the anode electrode 40.

The anode electrode 40 is placed on the metal plate 50. The metal plate 50 is a porous plate-shaped member configured so as not to inhibit conduction of the anode gas, and functions as a structural member for reinforcing strength of the fuel cell 10. Thus, the fuel cell 10 is configured as what is called a metal support type fuel cell in which the anode electrode 40, the solid electrolyte plate 20, and the cathode electrode 30 are stacked on the metal plate 50 as a support body.

The fuel cell stack 100 is constituted of the above-described stacked fuel cells 10, and the separator 70 is disposed between the adjacent fuel cells 10. In this embodiment, the fuel cell 10 includes a current collecting mesh 60 on a top surface of the above-described configuration in addition to the above-described configuration. The current collecting mesh 60 and the separator 70 are current collecting members that collect electric power generated by the fuel cell 10.

The current collecting mesh 60 is a member constituting a part of the fuel cell 10, and a mesh member (a metal porous body) woven with stainless steel or noble metal wires. The current collecting mesh 60 is arranged to be interposed between the cathode electrode 30 of the fuel cell 10 and the separator 70. The current collecting mesh 60 functions as a current collection auxiliary layer disposed to assist an electrical connection of the cathode electrode 30 with the separator 70.

It should be noted that while the current collecting mesh 60 is formed as the mesh member woven with the wires, the current collecting mesh 60 may be formed as a plate-shaped expanded metal. Thus, in the fuel cell stack 100, the metal porous body is used as the current collection auxiliary layer disposed between the cathode electrode 30 and the separator 70. While the fuel cell stack 100 includes the current collecting mesh 60 between the cathode electrode 30 and the separator 70, the current collecting mesh 60 may be omitted to cause the cathode electrode 30 to directly abut on the separator 70.

The separator 70 is a plate-shaped member formed by press molding on a conductive material such as metal. The separator 70 includes a first abutting portion 71 that abuts on one fuel cell 10 of the two adjacent fuel cells 10, a second abutting portion 72 that abuts on the other fuel cell 10 of the two adjacent fuel cells 10, and a connecting portion 73 that couples the first abutting portion 71 to the second abutting portion 72.

The separator 70 is constituted of an uneven member where the first abutting portion 71 and the second abutting portion 72 are arranged in alternation (in order) in predetermined one direction (a separator width direction) and the respective first abutting portion 71 and second abutting portion 72 are coupled by the connecting portion 73. With such an uneven structure, the separator 70 includes a plurality of cathode gas flow passages 74 on a surface at one side, and a plurality of anode gas flow passages 75 on a surface at the other side. Here, the separator width direction means a direction intersecting with extending directions of the gas flow passages 74, 75.

The first abutting portion 71 of the separator 70 is formed as a flat surface, and abuts on the cathode electrode 30 of the fuel cell 10 via the current collecting mesh 60. The separator 70 is secured to the cathode electrode 30 by welding a part of the first abutting portion 71 to a part of the cathode electrode 30.

The second abutting portion 72 of the separator 70 is formed as a flat surface, and abuts on the metal plate 50 of the fuel cell 10. The separator 70 is secured to the metal plate 50 by welding a part of the second abutting portion 72 to a part of the metal plate 50.

The connecting portion 73 of the separator 70 is formed as a wall portion that couples an end portion of the first abutting portion 71 to an end portion of the second abutting portion 72. A space formed by the connecting portions 73, the first abutting portion 71, and the metal plate 50 is the anode gas flow passage 75, and a space formed by the connecting portions 73, the second abutting portion 72, and the cathode electrode 30 is the cathode gas flow passage 74.

Since the fuel cell stack 100 is a stacked cell where a plurality of members such as the fuel cell 10 and the separator 70 are stacked, it is important to cause the abutting members to be brought in close contact mutually for reducing contact resistance between the members. Therefore, the fuel cell stack 100 is configured by stacking the respective members in a state where loads are applied from a lamination direction of the fuel cells 10.

The load applied on stacking causes the separator to be pressed in the lamination direction, then, the connecting portion near the abutting portion is deformed so as to decrease a thickness of the separator. In the fuel cell stack, a central portion of the abutting portion is bent as separating from the electrode of the fuel cell following the deformation of the separator connecting portion on stacking, thus generating a gap between the abutting portion of the separator and the electrode of the fuel cell in some cases.

This problem will be described in detail with reference to a fuel cell stack 200 according to a comparative example in FIG. 6A and FIG. 6B.

Figure 6A:
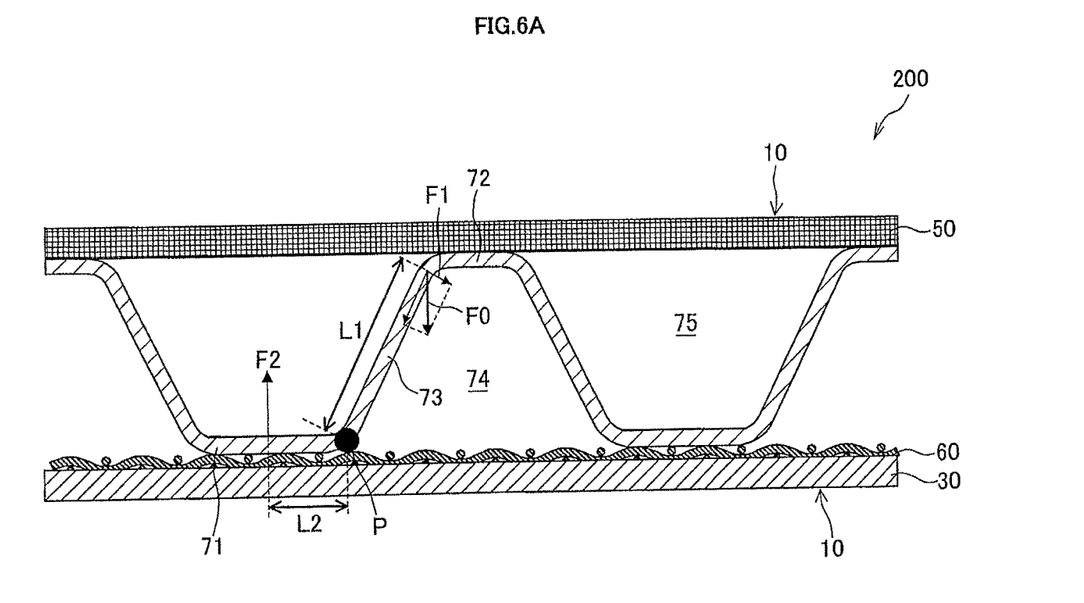
FIG. 6A is a diagram illustrating an enlarged proximity of a first abutting portion of a separator in a fuel cell stack according to a comparative example.
Figure 6B:
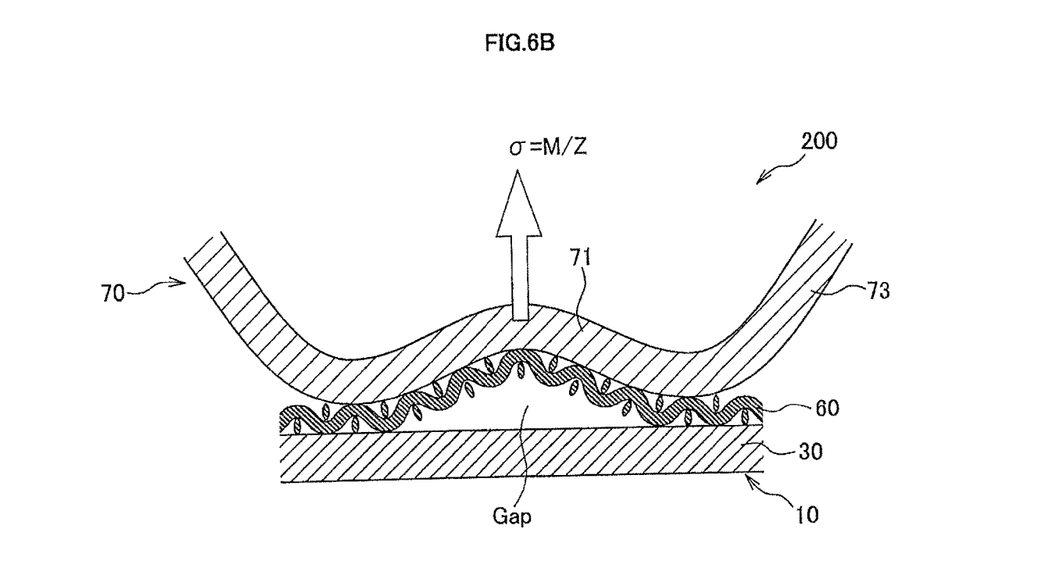
FIG. 6B is a diagram describing deformation of the separator in the fuel cell stack according to the comparative example.

FIG. 6A is a schematic vertical cross-sectional view of the fuel cell stack 200 according to the comparative example, and FIG. 6B is a diagram illustrating an enlarged proximity of a first abutting portion 71 of a separator 70 in the fuel cell stack 200. In this comparative example, the separator 70 has a constant plate thickness, and all of the first abutting portion 71, the second abutting portion 72, and the connecting portion 73 have a thickness t.

As illustrated in FIG. 6A, when a stacking load is applied to the fuel cell stack 200, the separator 70 is pressed in the lamination direction. At this time, a downward force F0 in FIG. 6A acts on an upper end of the connecting portion 73. The force F0 is divided into a component force along the connecting portion 73 and a component force F1 in a vertical direction to the connecting portion 73, and the component force F1 causes an upward force F2 at a central portion of the first abutting portion 71 via a fulcrum P (a coupling portion of a lower end of the connecting portion 73 and a right end of the first abutting portion 71). The force F2 causes an upward bending stress σ at the central portion of the first abutting portion 71 as illustrated in FIG. 6B, and a large bending stress σ deforms the central portion of the first abutting portion 71 so as to rise from the cathode electrode 30.

It should be noted that the bending stress σ that occurs at the central portion of the first abutting portion 71 of the separator 70 is represented by the following formula (1).

[Numeral 1]

$$\sigma = M/Z \tag{1}$$

σ: bending stress
M: moment of inertia of area
Z: section modulus

As seen from the formula (1), a value of the bending stress σ is calculated by a moment of inertia of area (F2×L2) at the central portion of the first abutting portion 71 and a section modulus based on a cross-sectional shape of the central portion of the first abutting portion 71. It should be noted that a moment M (F2×L2) of inertia of area at the central portion of the first abutting portion 71 is equal to a moment (F1×L1) at the upper end of the connecting portion 73, and a section modulus Z is determined on the basis of the thickness of the first abutting portion 71 at the central portion and a separator length in the extending direction (a depth direction of a paper surface of FIG. 6A) of the gas flow passages 74, 74. The separator 70 has a length L1 between both upper and lower ends of the connecting portion configured to be longer than a length L2 from the central portion to the end portion of the abutting portion.

As illustrated in FIG. 6B, when the central portion of the first abutting portion 71 is deformed due to the bending stress a so as to rise from the cathode electrode 30, a gap is generated between the first abutting portion 71 of the separator 70 and the cathode electrode 30 of the fuel cell 10.

The deformation of the first abutting portion 71 of the separator 70 in the fuel cell stack 200 is a phenomenon that possibly occurs in the case where the current collecting mesh 60 is not disposed. However, in the case where the current collecting mesh 60 is disposed between the first abutting portion 71 of the separator 70 and the cathode electrode 30 of the fuel cell 10, the first abutting portion 71 is more easily move, thus easily causing the deformation at the central portion of this first abutting portion 71. When the current collecting mesh 60 is disposed, the rising of the first abutting portion 71 of the separator 70 causes a problem that the current collecting mesh 60 is turned up in accordance with the deformation of the first abutting portion 71.

It should be noted that in the fuel cell stack 200, similar phenomenon possibly occurs on the second abutting portion 72 of the separator 70.

As described above, the gap generated between the separator 70 and the fuel cell 10 on stacking increases the contact resistance between the separator 70 and the fuel cell 10 and further decreases a current collecting area, thus reducing the power generation efficiency of the fuel cell stack 200.

To suppress the above-described deformation of the first abutting portion 71 of the separator 70, the bending stress σ on the first abutting portion 71 caused on stacking needs to be decreased. As seen with reference to the formula (1), for decreasing the bending stress σ, it is conceived to increase the section modulus Z determined by the cross-sectional shape of the first abutting portion 71. Therefore, the separator 70 of the fuel cell stack 100 according to the embodiment is configured such that the section modulus of the first abutting portion 71 is greater than the section modulus of the connecting portion 73. The separator 70 configured in such a way ensures reducing the deformation of the first abutting portion 71 of the separator 70 on stacking in the fuel cell stack 100.

Figure 2:
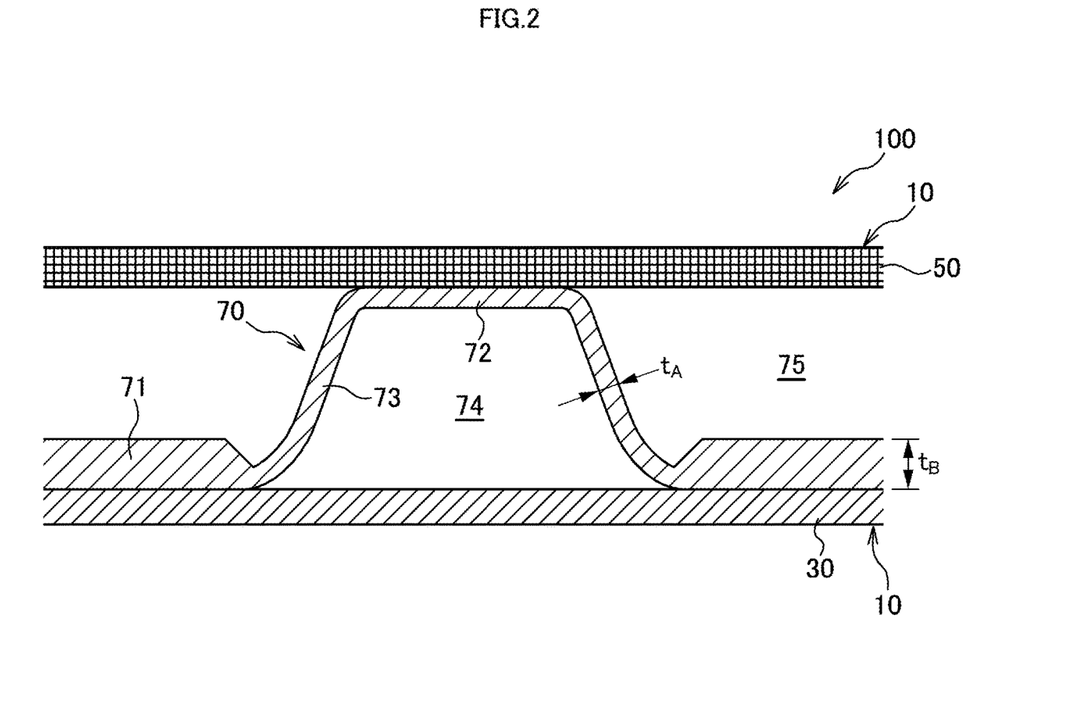
FIG. 2 is a partial cross-sectional view of a separator arranged between two adjacent fuel cells.

With reference to FIG. 2, the configuration of the separator 70 in the fuel cell stack 100 will be described. FIG. 2 is a partial cross-sectional view of the separator 70 arranged between two adjacent fuel cells 10. FIG. 2 omits an illustration of the current collecting mesh 60.

As illustrated in FIG. 2, the separator 70 is constituted of the uneven member in which the end portion of the first abutting portion 71 is coupled to the end portion of the second abutting portion 72 by the connecting portion 73. The separator 70 is formed such that the connecting portion 73 has a thickness (a plate thickness) tA thinner than a thickness (a plate thickness) tB of the first abutting portion 71. The first abutting portion 71 has a thickness of a main body portion including the central portion configured to be a thickness tB, and the first abutting portion 71 has both right and left ends formed as tapered end portions that become thinner toward the cathode electrode side. Then, the connecting portion 73 is coupled to a position closer to the lower side of the tapered end portion of the first abutting portion 71.

It should be noted that while the separator 70 is fabricated by the press molding of a material plate, especially, employing coining ensures forming the first abutting portion 71 such that only the first abutting portion 71 is thicker than other portions. While the second abutting portion 72 is formed to be identical to the connecting portion 73 in thickness, the second abutting portion 72 may be formed to be identical to the first abutting portion 71 in thickness.

Thus, the thickness tB of the first abutting portion 71 configured to be thicker than the thickness tA of the connecting portion 73 ensures the section modulus of the first abutting portion 71 of the separator 70 greater than the section modulus of the connecting portion 73. Then, the bending stress a on the first abutting portion 71 caused on stacking can be reduced. In this embodiment, dimensions in the separator length direction are identical in the first abutting portion 71 and the connecting portion 73.

Figure 3:
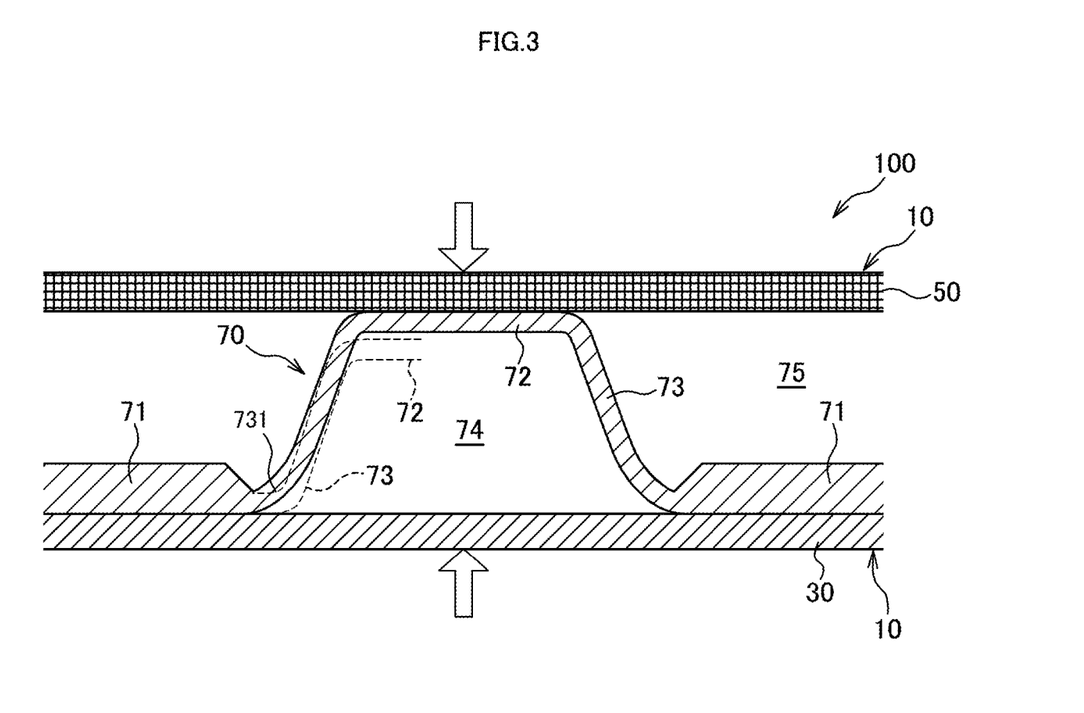
FIG. 3 is a diagram describing deformation of the separator on stacking.

Next, with reference to FIG. 3, the separator deformation on stacking will be described. FIG. 3 is a diagram describing the deformation of the separator 70 on stacking. FIG. 3 omits the illustration of the current collecting mesh 60.

When the stacking load is applied to the fuel cell stack 100 as indicated by void arrows in FIG. 3, the separator 70 is pressed in the lamination direction of the fuel cells 10, and the connecting portion 73 near the first abutting portion 71 is deformed so as to decrease the separator thickness. In the separator 70, the section modulus of the first abutting portion 71 is configured to be greater than the section modulus of the connecting portion 73, especially, a section modulus of a coupling portion 731 of the connecting portion 73 to the first abutting portion 71. Then, the bending stress σ on the first abutting portion 71 caused on stacking is decreased. Accordingly, while the connecting portion 73 of the separator 70 is deformed on stacking as indicated by dashed lines in FIG. 3, the bending stress σ caused on the first abutting portion 71 is small, that is, the first abutting portion 71 has a high flexural rigidity, thus reducing the deformation of this first abutting portion 71 even if the connecting portion 73 is deformed.

The above-described fuel cell stack 100 of the first embodiment provides the following effects.

The separator 70 of the fuel cell stack 100 is constituted of the uneven member that includes the first abutting portion 71 that abuts on one fuel cell 10 of the two adjacent fuel cells 10, the second abutting portion 72 that abuts on the other fuel cell 10, and the connecting portion 73 that connects the first abutting portion 71 to the second abutting portion 72. The separator 70 is configured such that the section modulus of the first abutting portion 71 is greater than the section modulus of the connecting portion 73. More specifically, the separator 70 is configured to have the thickness of the first abutting portion 71 thicker than the thickness of the connecting portion 73, thus having the section modulus of the first abutting portion greater than the section modulus of the connecting portion 73.

The separator 70 configured in such a way ensures the reduction of the bending stress σ caused at the central portion of the first abutting portion 71 on stacking. As a result, since a high bending stress acts on the connecting portion 73 compared with the first abutting portion 71 on stacking, the deformation of the first abutting portion 71 is reduced, preferably avoided even if the connecting portion 73 with the low flexural rigidity is deformed and this connecting portion 73 is deformed. Accordingly, even if the fuel cell stack 100 is configured by stacking, the formation of the gap between the first abutting portion 71 of the separator 70 and the cathode electrode 30 of the fuel cell 10 is restricted, thus ensuring the close contact between the separator 70 and the fuel cell 10. Then, the increase of the contact resistance between the separator 70 and the fuel cell 10 can be reduced, and the decrease of the current collecting area can be reduced, thus ensuring enhancing the power generation efficiency of the fuel cell stack 100.

The fuel cell stack 100 includes the current collecting mesh 60 (the metal porous body) arranged between the cathode electrode 30 of the fuel cell 10 and the separator 70. Even in the case where the current collecting mesh 60 is thus disposed, the configuration where the section modulus of the first abutting portion 71 of the separator 70 is greater than the section modulus of the connecting portion 73 can reduce the deformation of the first abutting portion 71 on stacking. Furthermore, the occurrence of the turning up of the current collecting mesh 60 caused by the deformation of the first abutting portion 71 can be reduced as well. As a result, the increase of the contact resistance between the separator 70 and the fuel cell 10 and the decrease of the current collecting area can be reduced.

It should be noted that while, in the separator 70 of the fuel cell stack 100, the second abutting portion 72 is formed to be identical to the connecting portion 73 in thickness, the second abutting portion 72 may be formed to be identical to the first abutting portion 71 in thickness. In this case, the separator 70 is configured such that the first and second abutting portions 71, 72 formed to have thicknesses thicker than the thickness of the connecting portion 73 causes the first and second abutting portions 71, 72 to have the section moduluses greater than the section modulus of the connecting portion 73. Such a configuration of the separator 70 can reduce the bending stresses caused on the first and second abutting portions 71, 72 on stacking, and reduce the deformation of those abutting portions 71, 72, thus ensuring reducing the increase of the contact resistance between the separator 70 and the fuel cell 10 and the decrease of the current collecting area.

Figure 4:
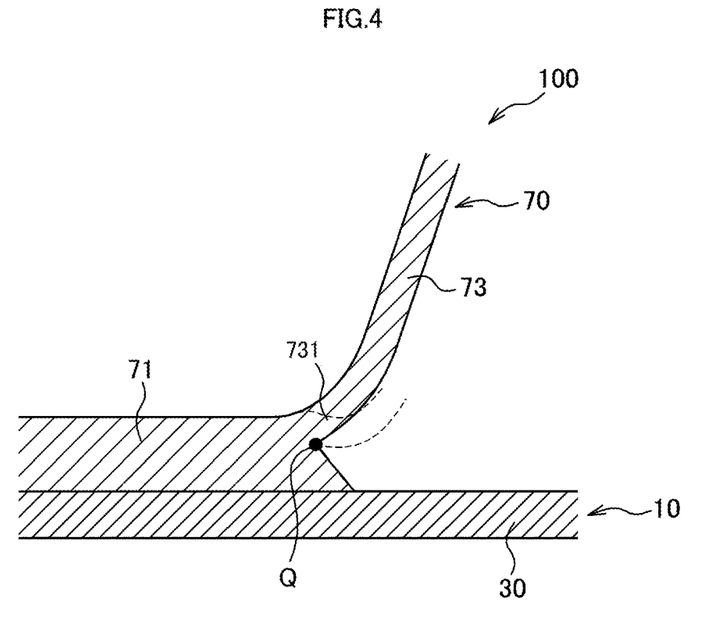
FIG. 4 is a diagram illustrating a part of a separator of a fuel cell stack according to one modification of the first embodiment.
Figure 5:
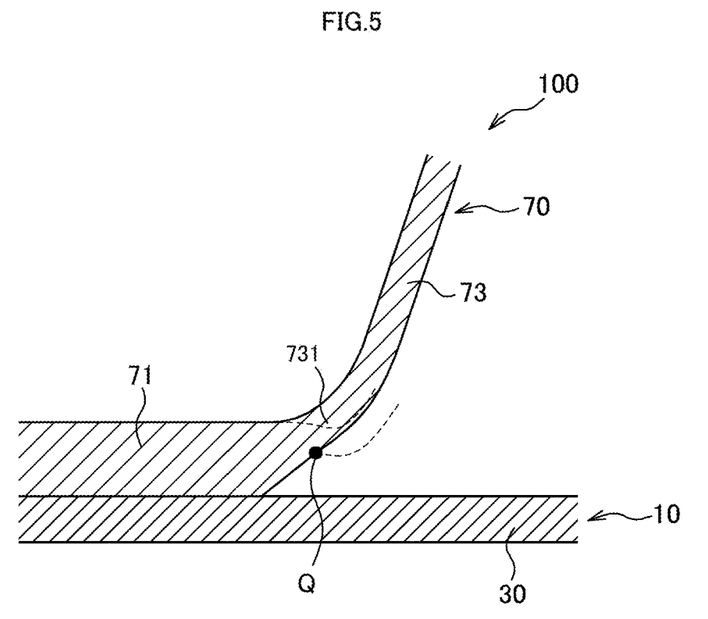
FIG. 5 is a diagram illustrating a part of the separator of the fuel cell stack according to one modification of the first embodiment.

Next, with reference to FIG. 4 and FIG. 5, descriptions will be given of separators 70 of fuel cell stacks 100 according to modifications of the first embodiment. FIG. 4 is a diagram illustrating a part of the separator 70 of the fuel cell stack 100 according to one modification, and FIG. 5 is a diagram illustrating a part of the separator 70 of the fuel cell stack 100 according to the other modification. FIG. 4 and FIG. 5 omit the illustrations of the current collecting mesh 60.

In the separator 70 of the first embodiment illustrated in FIG. 2, the connecting portion 73 is coupled to the position closer to the lower side of the tapered end portion of the first abutting portion 71. On the other hand, as illustrated in FIG. 4, in the separator 70 according to the one modification, the connecting portion 73 is coupled to a position closer to an upper side of the tapered end portion of the first abutting portion 71. This arranges a coupling lower end portion Q of the connecting portion 73 on a position apart from a surface of the fuel cell 10 (the cathode electrode 30).

Such an arrangement of the coupling lower end portion Q of the connecting portion 73 prevents the connecting portion 73 after the deformation from contacting the cathode electrode 30 even if the connecting portion 73 is deformed on stacking as indicated by dashed lines. When the connecting portion 73 after the deformation contacts the cathode electrode 30, the first abutting portion 71 possibly deforms having the contacting part as the fulcrum. The separator 70 according to the modification prevents the connecting portion 73 after the deformation from contacting the cathode electrode 30, thus further reducing the deformation of the first abutting portion 71. In the case where the current collecting mesh 60 is disposed between the separator 70 and the cathode electrode 30 of the fuel cell 10, the turning up of the current collecting mesh 60 caused by the deformation of the connecting portion 73 can be further reduced.

As illustrated in FIG. 5, in the separator 70 according to the other modification, the end portion of the first abutting portion 71 is formed as a tapered end portion, which gradually decreases in thickness while separating from the fuel cell 10, and the connecting portion 73 is coupled to a position closer to an upper side of the tapered end portion of the first abutting portion 71. This arranges a coupling lower end portion Q of the connecting portion 73 on a position apart from a surface of the fuel cell 10 (the cathode electrode 30). Even such a configuration of the separator 70 provides the effects similar to the modification in FIG. 4.

Second Embodiment

Figure 7:
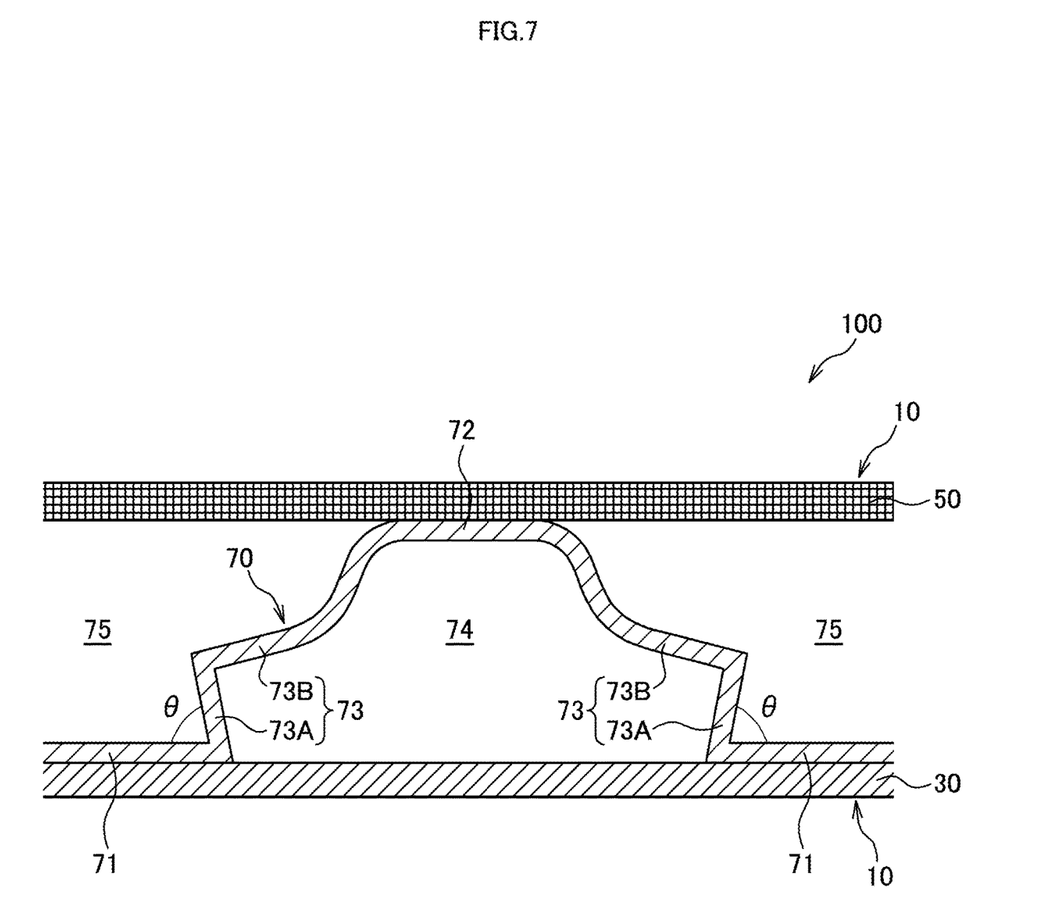
FIG. 7 is a schematic configuration diagram of a separator of a fuel cell stack according to a second embodiment of the present invention.
Figure 8A:
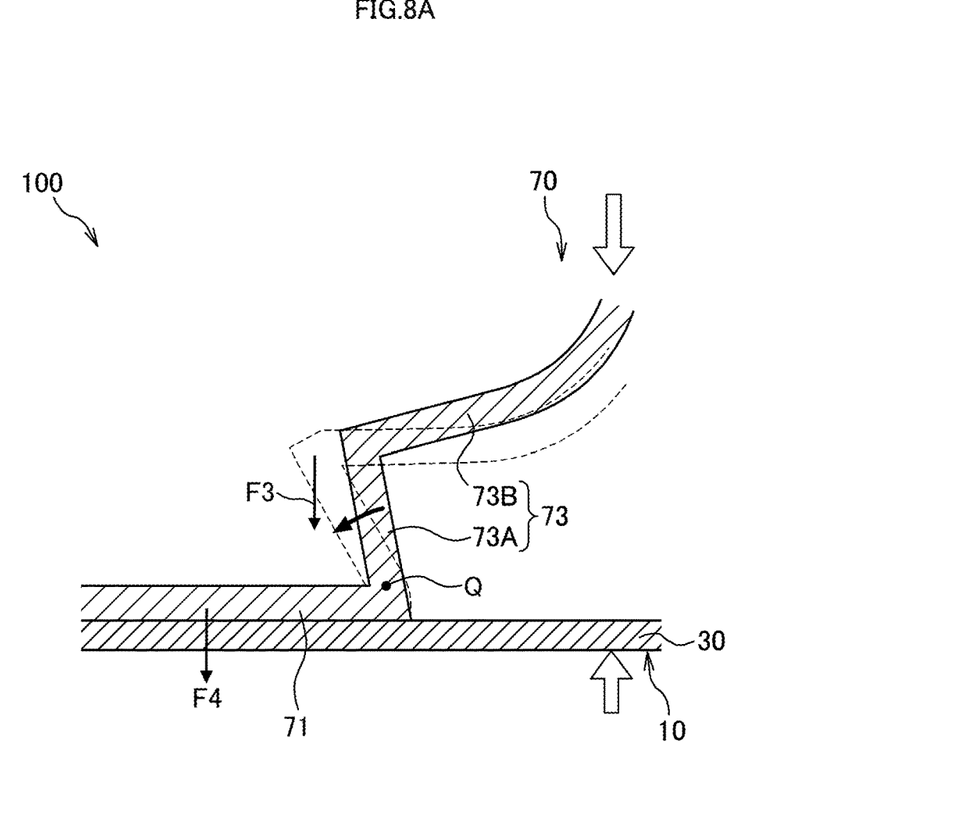
FIG. 8A is a diagram describing deformation of the separator of the fuel cell stack according to the second embodiment.

With reference to FIG. 7 and FIG. 8A, a fuel cell stack 100 according to a second embodiment of the present invention will be described. Technical ideas of this embodiment can be combined with the technical ideas of the first embodiment as necessary. In the following embodiment, like reference numerals designate configurations and the like with functions corresponding or identical to those in the first embodiment, and therefore such configurations will not be further elaborated here.

As illustrated in FIG. 7, in a separator 70 according to the second embodiment, the connecting portion 73 includes a standing wall 73A and an extending portion 73B.

The standing wall 73A of the separator 70 is a member standing from the end portion of the first abutting portion 71 toward the second abutting portion 72 side. The standing wall 73A has a lower end coupled to the end portion of the first abutting portion 71, and the standing wall 73A has an upper end coupled to a lower end of the extending portion 73B.

The extending portion 73B of the separator 70 is a member that extends from the upper end of the standing wall 73A in an arranging direction (a right-left direction in the drawing) of the first and second abutting portions 71, 72 while extending toward the end portion of the second abutting portion 72 in the lamination direction (the vertical direction in the drawing) of the fuel cell 10. The extending portion 73B couples the upper end of the standing wall 73A to the end portion of the second abutting portion 72. While the extending portion 73B illustrated in FIG. 7 is formed as a member curved so as to project toward the inside of the cathode gas flow passage 74, the extending portion 73B may be formed as a member linearly extending from the upper end of the standing wall 73A toward the end portion of the second abutting portion 72.

It should be noted that in the separator 70, the standing wall 73A is inclined with the upper end heading for the central portion of the first abutting portion 71, and an angle θ between the surface of the first abutting portion 71 and the surface of the standing wall 73A on the first abutting portion side is configured to be 90° or less. More preferably, the angle θ between the surface of the first abutting portion 71 and the surface of the standing wall 73A on the first abutting portion side is configured to be less than 90°. The angle between the standing wall 73A and the first abutting portion 71 is thus configured, the bending stress occurs at the central portion of the first abutting portion 71 on stacking downwardly different from the first embodiment.

With reference to FIG. 8A, the separator deformation on stacking will be described. FIG. 8A is a diagram describing the deformation of the separator 70 on stacking. FIG. 8A omits the illustration of the current collecting mesh 60.

As indicated by void arrows in FIG. 8A, when the stacking load is applied to the fuel cell stack 100, the separator 70 is pressed in the lamination direction of the fuel cells 10. At this time, a part of the stacking load acting on the separator 70 acts on the upper end of the standing wall 73A of the connecting portion 73 via the extending portion 73B of the connecting portion 73. The load thus acts to deform the standing wall 73A such that the upper end of the standing wall 73A falls down toward the first abutting portion 71. Applying the stacking load causes a downward force F3 in the drawing to act on the upper end of the standing wall 73A of the connecting portion 73. However, since the separator 70 has the angle θ between the first abutting portion 71 and the standing wall 73A configured to be 90° or less, a force F4 that acts on the central portion of the first abutting portion 71 is also a downward force. Thus, an upward bending stress does not occur on the first abutting portion 71 of the separator 70 on stacking, and this first abutting portion 71 is pressed to the fuel cell 10.

Accordingly, even in the case where the separator 70 and similar portion is pressed in the lamination direction on stacking, as indicated by dashed lines in FIG. 8A, only the standing wall 73A is deformed having a coupling portion. Q of this standing wall 73 and the first abutting portion 71 as a turning center, and the first abutting portion 71 of the separator 70 is not deformed.

The above-described fuel cell stack 100 of the second embodiment provides the following effects.

In the fuel cell stack 100, the angle θ between the connecting portion 73 of the separator 70 and the first abutting portion 71 is configured to be 90° or less. More specifically, the connecting portion 73 of the separator 70 includes the standing wall 73A standing from the first abutting portion 71 and the extending portion 73B extending from the standing wall 73A toward the second abutting portion 72, and the angle θ between the standing wall 73A and the first abutting portion 71 is configured to be 90° or less. Such a configuration causes the force F4 heading for the adjacent fuel cell 10 side to act on the central portion of the first abutting portion 71 of the separator 70 on stacking, thus pressing this first abutting portion 71 to the fuel cell 10.

Accordingly, when the separator 70 and similar portion is pressed in the lamination direction on stacking, the standing wall 73A is deformed so as to inwardly fall down toward the first abutting portion 71, and the first abutting portion 71 is not deformed as rising from the fuel cell 10. As a result, even if the fuel cell stack 100 is configured by stacking, the gap between the first abutting portion 71 of the separator 70 and the cathode electrode 30 of the fuel cell 10 is not formed, thus ensuring the close contact between the separator 70 and the fuel cell 10. Then, the increase of the contact resistance between the separator 70 and the fuel cell 10 can be reduced, and the decrease of the current collecting area can be reduced, thus ensuring enhancing the power generation efficiency of the fuel cell stack 100.

It should be noted that the fuel cell stack 100 according to the second embodiment includes the current collecting mesh 60 (the metal porous body) arranged between the cathode electrode 30 of the fuel cell 10 and the separator 70 as well. Even in the case where the current collecting mesh 60 is thus disposed, using the separator 70 with the above-described configuration can reduce the deformation of the first abutting portion 71 on stacking. Furthermore, the occurrence of the turning up of the current collecting mesh 60 caused by the deformation of the first abutting portion 71 can be reduced as well.

Figure 8B:
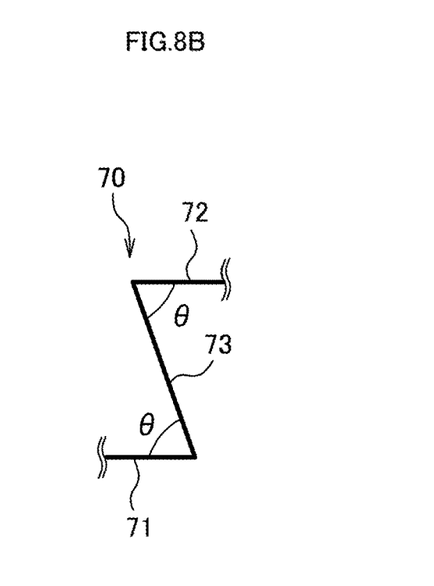
FIG. 8B is a diagram describing a separator according to a modification of the second embodiment.

The connecting portion 73 of the separator 70 may be configured such that the connecting portion 73 includes a standing wall standing from the second abutting portion 72 and an extending portion extending from this standing wall toward the first abutting portion 71, and an angle θ between the standing wall standing from the second abutting portion 72 and the second abutting portion 72 is configured to be 90° or less. Furthermore, when both deformations of the first and second abutting portions 71, 72 are simultaneously reduced, for example, as illustrated in FIG. 8B, the separator 70 may have the angle θ between the connecting portion 73 and the first abutting portion 71 configured to be 90° or less (more preferably, a value less than 90°) and the angle θ between the connecting portion 73 and the second abutting portion 72 configured to be 90° or less (more preferably, a value less than 90°). Furthermore, the separator 70 may be configured such that an angle between the standing wall constituting the lower end portion of the connecting portion 73 and the first abutting portion 71 is configured to be 90° or less, an angle between the standing wall constituting the upper end portion of the connecting portion 73 and the second abutting portion 72 is configured to be 90° or less, and the standing wall on the first abutting portion 71 side is connected to the standing wall on the second abutting portion 72 side by a common extending portion.

Furthermore, while in the separator 70 of the fuel cell stack 100 according to the second embodiment, the plate thickness of the separator 70 is constant, at least the first abutting portion 71 of the first and second abutting portions 71, 72 may have the thickness formed to be thicker than the thickness of the connecting portion 73 so as to increase the section modulus of the abutting portion as well as the first embodiment.

Modifications of First and Second Embodiments

Figure 9:
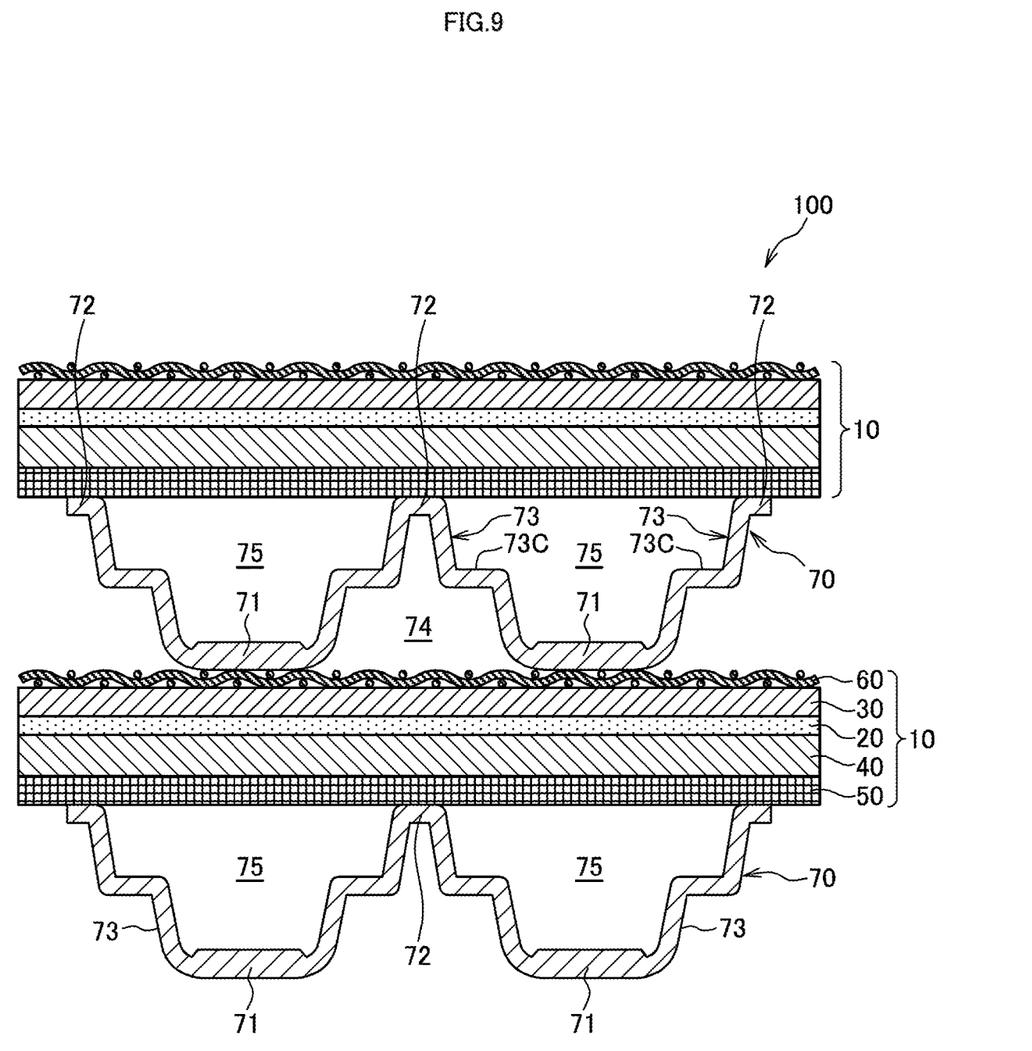
FIG. 9 is a diagram illustrating a fuel cell stack according to one modification of the first embodiment.

Next, fuel cell stacks 100 according to modifications of the first and second embodiments of the present invention will be described. FIG. 9 is a diagram illustrating the fuel cell stack 100 according to one modification of the first embodiment.

A separator 70 of the fuel cell stack 100 according to the modification illustrated in FIG. 9 includes, similarly to the first embodiment, a first abutting portion 71, a second abutting portion 72, and a connecting portion 73 that connects the first and second abutting portions 71, 72.

The connecting portion 73 includes a flat portion 73C extending in a direction perpendicular to the lamination direction of the fuel cells 10 such that a level difference is formed between the first abutting portion 71 and the second abutting portion 72. The flat portion 73C is formed such that a part of the connecting portion 73 is disposed to extend from the first abutting portion 71 side in the lamination direction, subsequently bent in the arranging direction of the first and second abutting portions 71, 72, and then, bent toward the second abutting portion 72 in the lamination direction. Thus, the connecting portion 73 including the flat portion 73C has a cross section of the connecting portion 73 in the lamination direction in a crank shape.

The separator 70 has a configuration where the connecting portion 73 includes the flat portion 73C, and the flat portion 73C deformed so as to be inclined when a load equal to or more than a predetermined load acts can absorb the load in the lamination direction of the fuel cells 10.

For example, when the stacking is performed in a state where the first and second abutting portions of the separator partially contact the fuel cell, contact pressures of the partially contacting parts locally increase, thus possibly causing a damage of the separator and similar portion.

Figure 10:
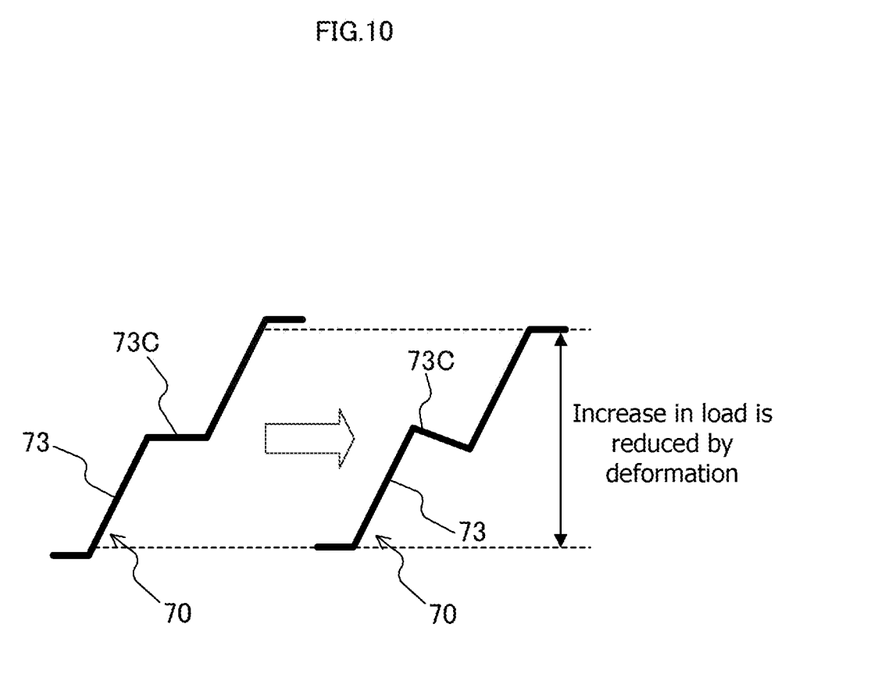
FIG. 10 is a diagram describing deformation of a connecting portion of the separator.

However, in the fuel cell stack 100, when a certain amount of load acts on the separator 70, the connecting portion 73 deforms such that the flat portion 73C inclines as illustrated in FIG. 10 and the separator 70 contracts in the thickness direction. Then, the increase of the load acting on the separator 70 on stacking can be reduced. As a result, a contact surface pressure between the members on stacking can be prevented from locally increasing, thus ensuring uniformity of the contact surface pressure.

In FIG. 9, the case where the flat portion 73C is formed on the connecting portion 73 of the separator 70 of the first embodiment has been described. However, the separator 70 of the second embodiment illustrated in FIG. 7 may include the flat portion 73C. When the flat portion 73C is disposed on the separator 70 of the second embodiment, the flat portion 73C is formed on the middle of the extending portion 73B of the connecting portion 73.

The embodiments of the present invention described above are merely illustration of some application examples of the present invention and not of the nature to limit the technical scope of the present invention to the specific constructions of the above embodiments.

While the fuel cell stack 100 is configured as the stacked cell where the solid oxide fuel cells are stacked in the above-described first and second embodiment, the fuel cell stack 100 may be configured as a stacked cell where polymer electrolyte fuel cells are stacked.

In the first embodiment, the separator 70 is configured such that the entire abutting portions 71, 72 has the thickness thicker than the thickness of the connecting portion 73 so as to increase the section moduluses of the abutting portions 71, 72. However the abutting portions 71, 72 may be formed to increase the thicknesses continuously or in phases from the end portions toward the central portions, so as to have the thicknesses of the central portions thicker than the thickness of the connecting portion 73,

The invention claimed is:

1. A fuel cell stack in which a plurality of fuel cells are stacked via separators, each of the fuel cells including a solid electrolyte plate interposed between an anode electrode and a cathode electrode, wherein:
   each of the separators is constituted of a single layer of an uneven member that includes a first abutting portion abutting on one fuel cell of two adjacent fuel cells of the plurality of fuel cells, a second abutting portion abutting on another fuel cell of the two adjacent fuel cells, and a connecting portion having an end portion coupled to the first abutting portion and another end portion coupled to the second abutting portion, and
   at least one abutting portion of the first abutting portion or the second abutting portion has a central portion formed to have a thickness greater than a thickness of at least one of the end portions of the connecting portion, and the at least one abutting portion has a section modulus greater than a section modulus of the connecting portion.

2. The fuel cell stack according to claim 1, wherein:
   each fuel cell is a solid oxide fuel cell that includes the solid electrolyte plate constituted of a solid oxide, each fuel cell further includes a metal porous body arranged between the cathode electrode and the first abutting portion, and the first abutting portion has a section modulus greater than the section modulus of the connecting portion.

3. A fuel cell stack in which a plurality of fuel cells are stacked via separators, each fuel cell including a solid electrolyte plate interposed between an anode electrode and a cathode electrode, wherein:
   a separator is constituted of an uneven member that includes a first abutting portion, a second abutting portion, and a connecting portion, the first abutting portion abuts on one fuel cell of two adjacent fuel cells of the plurality of fuel cells, the second abutting portion abuts on the other fuel cell of the two adjacent fuel cells, and the connecting portion connects the first abutting portion to the second abutting portion,
   at least one abutting portion of the first abutting portion or the second abutting portion has a central portion formed to have a thickness greater than a thickness of an end portion of the connecting portion coupled to the at least one abutting portion, and the at least one abutting portion has a section modulus greater than a section modulus of the connecting portion,
   each fuel cell is a solid oxide fuel cell that includes the solid electrolyte plate constituted of a solid oxide, each fuel cell further includes a metal porous body arranged between the cathode electrode and the first abutting portion, and the first abutting portion has a section modulus greater than the section modulus of the connecting portion, and
   the connecting portion has an end portion coupled to an end portion of the first abutting portion, and the end portion of the connecting portion coupled to the first abutting portion is arranged on a position apart from a surface of the fuel cell.

4. A fuel cell stack in which a plurality of fuel cells are stacked via separators, each of the fuel cells including a solid electrolyte plate interposed between an anode electrode and a cathode electrode, wherein:

each of the separators is constituted of a single layer of an uneven member that includes a first abutting portion abutting on one fuel cell of two adjacent fuel cells of the plurality of fuel cells, a second abutting portion abutting on another fuel cell of the two adjacent fuel cells, and a connecting portion having a first end portion coupled to the first abutting portion and a second end portion coupled to the second abutting portion, and at least one abutting portion of the first abutting portion or the second abutting portion has a central portion formed to have a thickness greater than a thickness of at least one of the end portions of the connecting portion.

5. The fuel cell stack according to claim 1, wherein each fuel cell is a solid oxide fuel cell that includes the solid electrolyte plate constituted of a solid oxide, each fuel cell further includes a metal porous body arranged between the cathode electrode and the first abutting portion, and an angle θ between the connecting portion and the first abutting portion is configured to be 90° or less.

6. The fuel cell stack according to claim 5, wherein:

the connecting portion includes a standing wall that stands from the first abutting portion and an extending portion that extends from the standing wall toward the second abutting portion, and an angle θ between the standing wall and the first abutting portion is configured to be 90° or less.

7. The fuel cell stack according to claim 1, wherein the connecting portion has a flat portion extending in a direction perpendicular to a lamination direction of the fuel cells.

8. The fuel cell stack according to claim 1, wherein the at least one abutting portion has a tapered end portion, and the connecting portion is coupled to the tapered end portion.

9. The fuel cell stack according to claim 2, wherein the end portion of the connecting portion coupled to the first abutting portion is arranged on a position apart from a surface of the fuel cell on which the first abutting portion abuts.

* * * * *